(12) United States Patent
Sylvain (10) Patent No.: US 10,805,419 B2
(45) Date of Patent: Oct. 13, 2020

(54) WEB APPLICATION CONFIGURATION MANAGEMENT

(71) Applicant: Genband US LLC, Plano, TX (US)

(72) Inventor: Dany Sylvain, Gatineau (CA)

(73) Assignee: RIBBON COMMUNICATIONS OPERATING COMPANY, INC., Westford, MA (US)

( * ) Notice: Subject to any disclaimer, the term of this patent is extended or adjusted under 35 U.S.C. 154(b) by 230 days.

(21) Appl. No.: 15/681,762

(22) Filed: Aug. 21, 2017

(65) Prior Publication Data
US 2019/0058776 A1  Feb. 21, 2019

(51) Int. Cl.
G06F 15/16 (2006.01)
G06F 15/177 (2006.01)
H04L 29/08 (2006.01)
G06F 8/60 (2018.01)
H04L 29/06 (2006.01)

(52) U.S. Cl.
CPC ............ *H04L 67/2847* (2013.01); *G06F 8/60* (2013.01); *H04L 63/08* (2013.01); *H04L 67/02* (2013.01); *H04L 67/34* (2013.01); *H04L 67/42* (2013.01); *H04L 67/146* (2013.01)

(58) Field of Classification Search
CPC ...... H04L 67/2847; H04L 67/34; H04L 63/08
USPC .................................. 709/202–203, 217–220
See application file for complete search history.

(56) References Cited

U.S. PATENT DOCUMENTS

| | | | | |
|---|---|---|---|---|
| 7,627,671 B1* | 12/2009 | Palma | ................. | G06F 11/3616 709/223 |
| 9,009,534 B2* | 4/2015 | Plate | ................... | G06F 11/3612 709/220 |
| 9,886,272 B1* | 2/2018 | Zhou | ................... | G06F 8/76 |
| 10,333,985 B2* | 6/2019 | Pulapaka | ............ | H04L 41/5025 |
| 2015/0121462 A1* | 4/2015 | Courage | ................ | H04L 63/08 726/4 |
| 2015/0295984 A1* | 10/2015 | Tan | ........................ | H04L 67/34 709/203 |
| 2016/0014191 A1* | 1/2016 | Liu | ........................ | H04L 67/02 709/202 |
| 2017/0140132 A1* | 5/2017 | Yu | ............................ | G06F 8/71 |
| 2019/0297116 A1* | 9/2019 | Pulapaka | ............... | H04L 63/20 |

OTHER PUBLICATIONS

PCT International Searching Authority—US; Notification of Transmittal of the International Search Report and the Written Opinion of the International Searching Authority, or the Declaration for International Application No. PCT/US2018/000320: dated Nov. 29, 2018; 10 pages; Alexandria, Virginia.

* cited by examiner

*Primary Examiner* — Bharat Barot
(74) *Attorney, Agent, or Firm* — Haynes and Boone, LLP (57) ABSTRACT

A method performed by a computing system includes executing a web application container and in response to determining that a runtime web application for the web application container is not locally accessible, prompting a user for credentials. The method further includes sending the credentials to a configuration server and after sending the credentials to the configuration server, receiving a target uniform resource locator (URL). The target URL may point to a runtime web application on a first runtime web application server. The method further includes downloading the runtime web application to the computing system and executing the runtime web application.

20 Claims, 5 Drawing Sheets

WEB APPLICATION CONFIGURATION MANAGEMENT

BACKGROUND

Web applications may include those that are designed to operate through a web browser using a web protocol, such as HTTP. Specifically, a typical web application involves a server component and a client component. The client component is designed to operate within a web browser. A web browser may include an application that is used to retrieve data from a server and render that data for display to a user. Such data may be associated with web pages or web applications. Examples of such web applications may be internet email applications, internet retail applications, and web communication applications.

One example of a web communication application is a WebRTC (Web Real Time Communication) application. WebRTC is a project by the World Wide Web Consortium (3C) to define a set of Application Programming Interfaces (APIs) to enable browser-to-browser and browser-to-device applications for voice, video, and text. The introduction of WebRTC as a solution allows for the creation of new usage models for communication services. One new usage model includes the ability of a web user to simply initiate a real-time communication via a web application on the user's device (e.g., a personal computer, mobile device, etc.). In this model, the user can access an identifier (e.g., uniform resource identifier (URI)) pointing to a specific carrier communication ID (e.g., phone number, SIP user ID) through the web application to initiate the WebRTC communication session.

In some cases, a provider of web communication applications may wish to provide customized interfaces to its customers. For example, a particular organization such as a business or government agency, may wish to use a web communication application that is customized for its purposes. Such customizations may include various appearance related features and operational features. It is desirable to have an efficient and intuitive way to provide such customized web applications to customers.

BRIEF DESCRIPTION OF THE DRAWINGS

The present disclosure is best understood from the following detailed description when read with the accompanying figures.

SUMMARY

According to one example, a method performed by a computing system includes executing a web application container and in response to determining that a runtime web application for the web application container is not locally accessible, prompting a user for credentials. The method further includes sending the credentials to a configuration server and after sending the credentials to the configuration server, receiving a target uniform resource locator (URL). The target URL may point to a runtime web application on a first runtime web application server. The method further includes downloading the runtime web application to the computing system and executing the runtime web application.

According to one example, a method performed by a runtime web application server includes receiving authentication data from a configuration server. The authentication data may be associated with a first entity. The runtime web application server may maintain a plurality of runtime web applications associated with different entities. The configuration server may be configured to receive the authentication data from a bootstrap application running on a client device associated with the first entity. The method further includes confirming the authentication data in response to matching the authentication data to a database within the runtime web application server, receiving a request from the client device to download one of the plurality of runtime web applications, and in response to the request, downloading the one of the plurality of runtime web applications to the client device.

According to one example, a system includes a processor and a memory comprising machine readable instructions that when executed by the processor cause the system to: in response to determining that no runtime web application for a web application container is locally accessible, execute a bootstrap application within the web application container, send credentials obtained from a user to a configuration server, after sending the credentials to the configuration server, receive a target uniform resource locator (URL), the target URL pointing to a runtime web application on a first runtime web application server and download the runtime web application.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As discussed above, it would be desirable for providers of web applications, such as web communication applications, to provide customized applications for different customers. According to principles described herein, a generic web application container can be configured based on the identity of a user that first uses it. The web application container may include an application that uses a web engine, such as the web engine used in a web browser, to provide some of the functionality of the web browser, but with a different interface. Specifically, the interface may be designed specifically for a particular web application or set of web applications.

According to one example, when the web application container is first launched, it loads a bootstrap application that provides some basic functionality to prompt a user for credentials. Such credentials may include, for example, a username and password. With the user provided credentials, the bootstrap application consults a configuration server that is able to provide a Uniform Resource Locator (URL) to a web application server that stores a runtime web application that has already been customized for that user. When provided with that URL, the web application container can use the URL to load the actual web application, essentially configures the web application container as customized by the user.

Using such a system, a web application provider can provide a generic web application container to each of its customers. In other words, the same web application container may be used by a multiplicity of different customers to run a number of differently customized web applications for those customers. Those customers may then set up their own customized web applications which are then stored on various servers. The customer may then log in from any device running the generic web application container and be able to utilize the customized web application from within the generic web application container.

Figure 1:
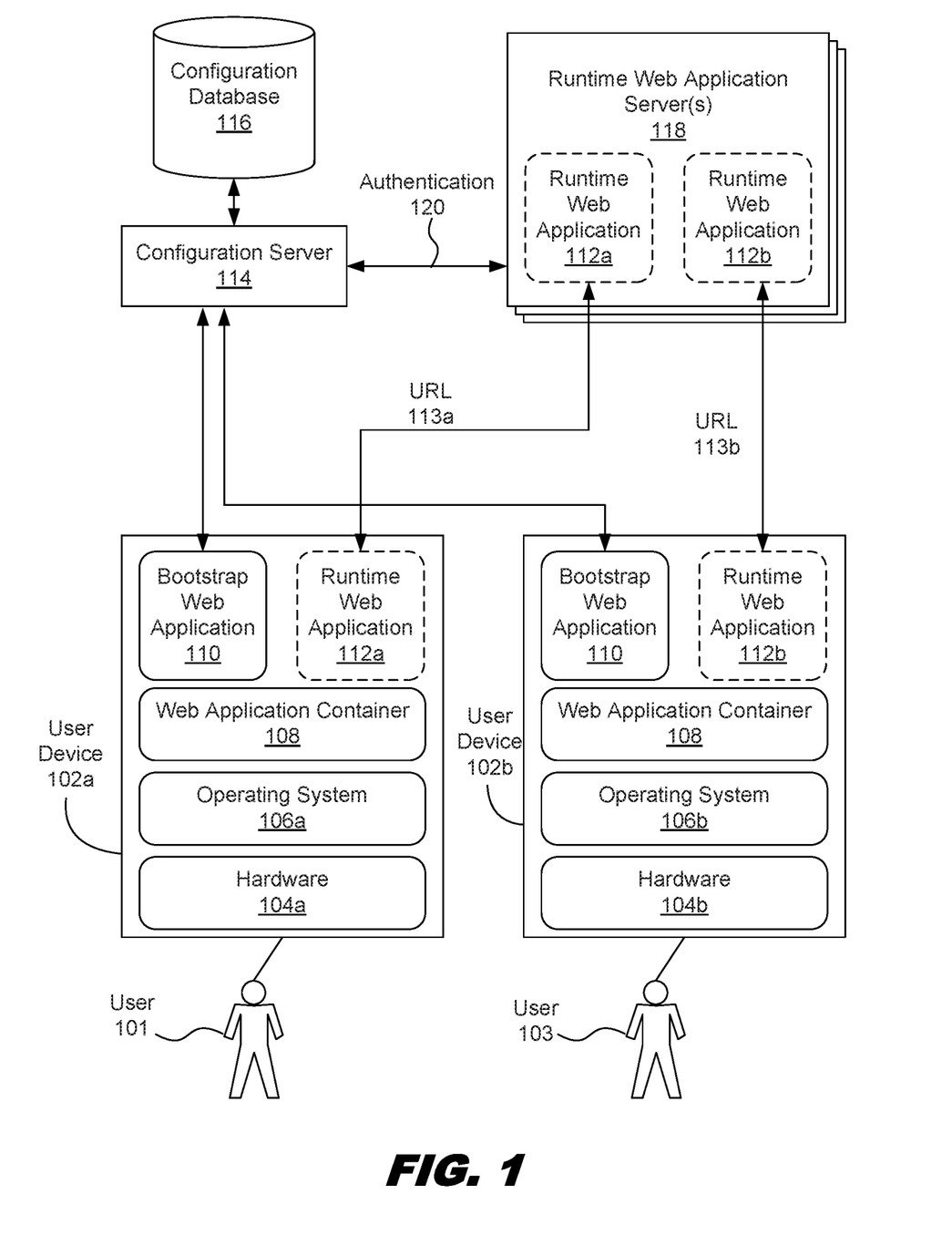
FIG. 1 illustrates an example of a communication service that may be used to centrally provide an interactive call menu for a call structure, according to one example of principles described herein.

FIG. 1 illustrates an example of a communication service that may be used to centrally provide an interactive call menu for a call structure. According to the present example, there are two user devices 102a, 102b. The user devices 102a, 102b may be various computing systems such as a desktop computer, a laptop computer, a tablet device or a mobile phone. The user devices 102a, 102b include hardware 104a, 104b, operating systems 106a, 106b, and web application containers 108.

The hardware 104a, 104b includes components such as processors, memory, network interfaces, and other physical resources. The hardware 104a from the first user devices 102a may be different than the hardware 104b from the second user device 102b.

The operating systems 106a, 106b are software applications that provide other applications with access to the physical resources (e.g., hardware 104a, 104b) of the user devices 102a, 102b. The operating system 106a of the first user device 102a may be different than the operating system of the second hardware devices 102b.

Each of the user devices 102a, 102b has a web application container installed. As described above, the web application container 108 is a generic or standardized application. In other words, it is not customized for particular customers or individuals. The web application container 108 may include a web engine that performs that functionality of web browsers. For example, the web application is able to retrieve data from the Internet using Hypertext Transfer Protocol (HTTP). Such data may be formatted in Hypertext Markup Language (HTML). The web application container 108 may also be able to use javascript, flash, and other web-based technologies. In some examples, the web application container 108 may be designed to run a specific web application or set of web applications.

If a web application container 108 is being run for the first time, or if it does not currently have a customized web application to load, it will run a bootstrap application 110. The bootstrap application 110 may provide basic functionality, which may include retrieving credentials from a user 101. Such credentials may include a username and password. Upon receiving the credentials from the user 101, the bootstrap application 110 may transmit those credentials to a configuration server 114.

The configuration server 114 may be a server that is associated with the entity that provides the web application 112a. For example, the configuration server 114 may be owned, operated, leased, or managed by the entity. Using the example in which the web application 112a is a web communication application, the entity may be referred to as the web communication service provider. The configuration server 114 is designed to interface with various user devices 102a and respond to requests to configure such devices. The configuration server 114 may access a configuration database 116 that includes a list of user credentials and the location at which a customizable runtime web application is stored for the users associated with such credentials. For example, the configuration database 116 may store a Uniform Resource Locator (URL) that points to a runtime web application server 118 that stores the desired runtime web application 112a. In some examples, the configuration server 114 may send an authentication request 120 to the runtime web application server 118a to ensure that the user device 102a is authorized to receive the URL.

In the present example, when user 101 provides his or her credentials through user device 102a, the user device 102a receives URL 113a, sometimes referred to as a target URL 113a, from the configuration server 114. Using URL 113a, a runtime web application 112a that has been customized for the user 101, or an entity associated with the user 101, is loaded within the web application container 108. The runtime web application 112a may have a customized interface and may be designed to work with specified servers as dictated by the configuration data. In some examples, the configuration data received from the configuration server 114, such as the URL 113a, can be stored locally so that on a subsequent startup of the web application container 108, the runtime web application 112a will automatically be loaded instead of the bootstrap application 110.

Figure 2:
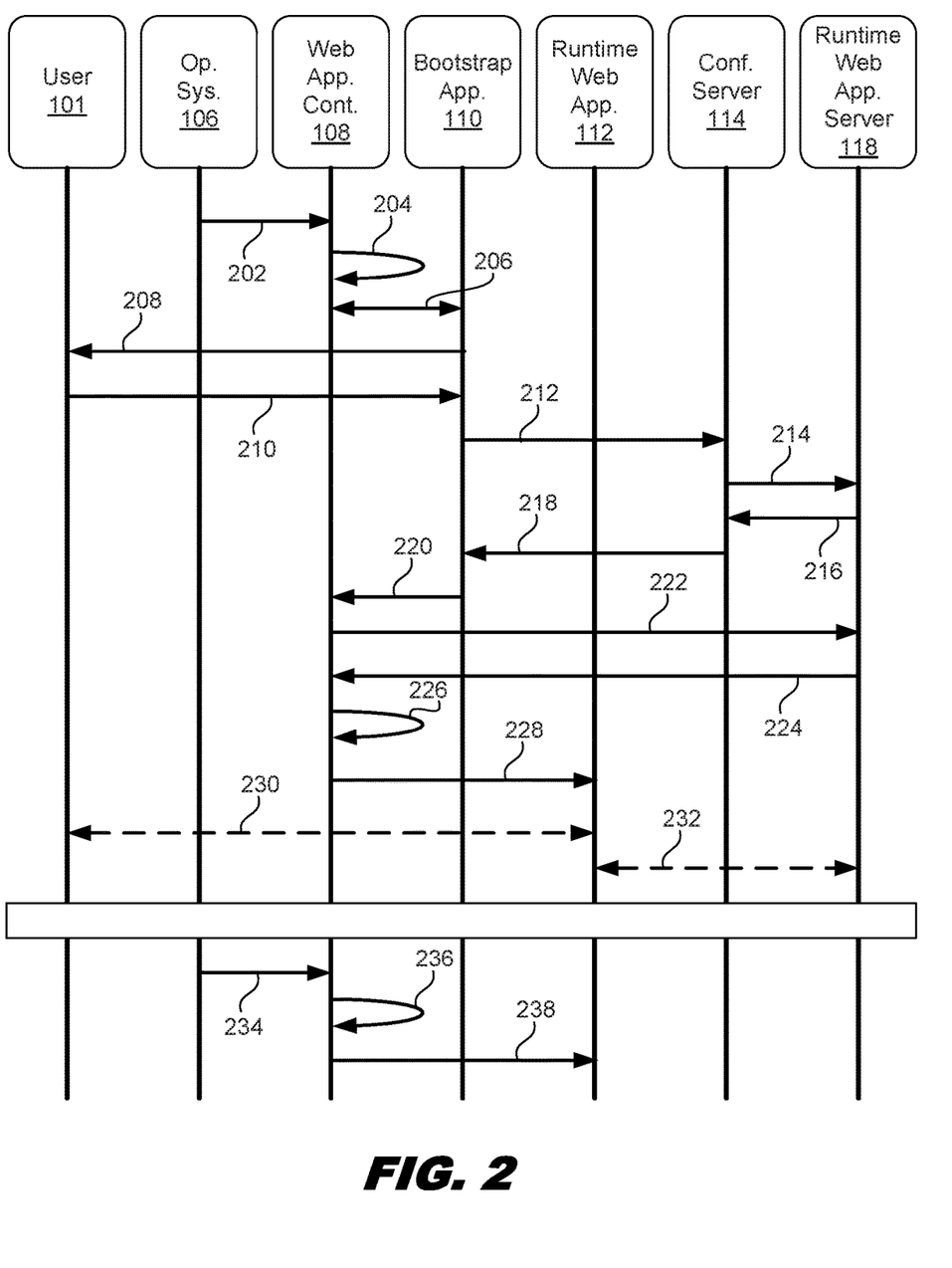
FIG. 2 is a flow diagram showing web application configuration, according to one example of principles described herein.

Similarly, when user 103 provides his or her credentials through user device 102b, the user device 102b receives URL 113b from the configuration server 114. Using URL 113b, a runtime web application 112b that has been customized for the user 103, and is different than runtime web application 112a, is loaded within the web application container 108 of the user device 102b. In some examples, URL 113a points to the same server as URL 113b. However, in some examples, URL 113b points to a different server than does URL 113a. Again, if the configuration data for the runtime web application 112b is stored locally on the user device 102b, then the runtime web application 112a FIG. 2 is a flow diagram showing web application configuration. According to the present example, at signal 202, the operating system 106 loads the web application container 108. For example, the operating system may load the processor instructions associated with the web application container in memory and provide the web application container 108 with access to computing and other hardware resources. Such hardware resources may include microphones, speakers, haptic feedback mechanisms, display hardware, or proximity sensors. The operating system may also provide other pieces of information to the web application container such as device location, network type, changes in network type, or cellular call state. The operating system may also provide the web application container 108 access to notifications, simple message systems, and other resources.

At signal 204, the web application container 108 determines whether there is any locally saved configuration data. If not, then at signal 206, the web application container 108 loads the bootstrap application 110. The bootstrap application 110 then prompts the user for credentials at signal 208. At signal 210, the user 101 provides the bootstrap application 110 with the credentials.

At signal 212, the bootstrap application 110 sends a request to the configuration server 114 for configuration data. The request includes the credentials that were provided by the user 101. The configuration server 114 may then consult a configuration database (e.g., 116, FIG. 1) to determine the URL for the appropriate runtime web application. In some cases, the runtime web application 112 may be made available on multiple servers. In some examples, the runtime web application 112 may be on a single server. In either case, the configuration server 114 finds the URL for the runtime web application associated with the user 101.

In some cases, before providing the URL to the user 101, the configuration server 114 may authenticate the user's request. For example, at signal 214, the configuration server 114 sends an authentication request to the runtime web application server 118 associated with the URL. At signal 216, the runtime web application server 118 responds with an authentication acknowledgement if it is determined that the user is indeed authorized to use that customized runtime web application. If the user 101 is not authorized to use that runtime web application 112, then the authentication request will be denied. Various authentication mechanisms may be used to perform the authentication. For example, OAuth, which is an open standard for token-based authentication and authorization may be used.

At signal 218, the configuration server 114 provides the bootstrap application 110 with the URL associated with the user's 101 runtime web application. At signal 220 the bootstrap application 110 provides the URL to the web application container 108. At signal 222, the web application container 108 uses the URL to request the runtime web application 112 from the runtime web application server 118. At signal 224, the runtime web application server 118 responds by sending the client portion of the runtime web application to the web application container 108. In some examples, as shown at signal 226, the web application container stores the client portion of the runtime web application 112 locally on the user's 101 device (e.g., 102a, FIG. 1). Then, at signal 228, the web application container loads and executes the runtime web application 112 within the web application container 108.

The runtime web application 112 may then operate to provide the user with its specific features. For example, if the runtime web application 112 is a communication application, then the runtime web application 112 may present the user 101 with a user interface for calling other persons using various types of media, such as voice, video, and text. Signal 230 represents the interaction between the user 101 and the runtime web application 112. Signal 232 represents the interaction between the runtime web application 112 and the runtime web application server 118. The runtime web application 112, along with the runtime web application server 118, may support real time communications such as a WebRTC communication sessions.

Signal 234 represents a subsequent startup of the web application container 108. At signal 236, the web application container 108 determines that a customized version of the runtime web application is stored locally. Thus, at signal 238, that runtime web application 112 is loaded into the web application container 108 without the use of the bootstrap application 110 or the configuration server 114. In some examples, instead of locally storing the runtime web application, only the URL may be stored. In such case, the web application container 108 may check upon startup whether there is a URL stored locally. If so, the web application container 108 may then obtain the runtime web application 112 as done in signal 222. If no URL or runtime web application is stored locally, then the bootstrap application 110 will be loaded as shown in signal 206.

In some examples, upon startup, the web application container 108 may be configured to determine whether a newer version of the runtime web application 112 that is currently associated with the web application container 108 is available. If a new version of the runtime web application is available, then the web application container 108 may automatically obtain the newer version from the runtime web application server 118. In other words, the newer version may be obtained without requiring input from the user 101.

The user may also log on from different devices, which may use different operating systems. For example, a mobile device may use a different operating system than a desktop device. Different devices may have different web application containers that are compatible with different operating systems. For example, a web application container for a mobile device may be different than a web application container for a desktop device. Similarly, the web application container for one type of desktop operating system may be different than the web application container for a different type of desktop operating system. However, the different types of web application containers may load the same runtime web application. In other words, users may log on from different devices with different platforms and use the same runtime web application.

Figure 3:
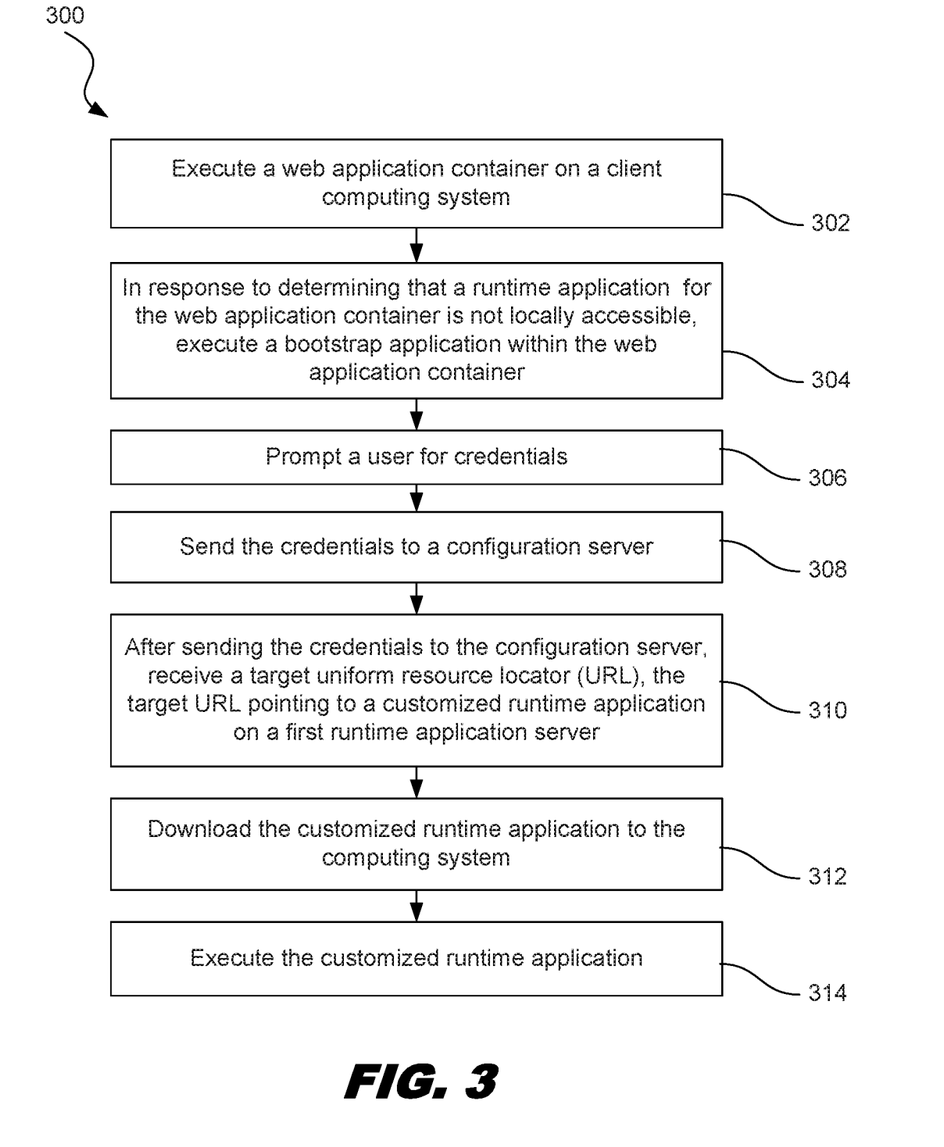
FIG. 3 is a flowchart showing an illustrative method performed by a client device for web application configuration, according to one example of principles described herein.

FIG. 3 is a flowchart showing an illustrative method performed by a client device for web application configuration. In one example, the client device may perform method 300 by reading code from a computer readable medium and executing that code with one or more processors. According to the present example, the method 300 includes a step 302 for executing a web application container (e.g., 108, FIG. 1) on a client computing system (e.g., 102a, FIG. 1). The web application container may be specifically adapted for use with the operating system or platform of the client computing system.

The method 300 further includes a step 304 for, in response to determining that a runtime web application for the web application container is not locally accessible, executing a bootstrap application within the web application container. For example, if it is the first time the web application container is being run, or if the previous runtime web application has been removed, then there will not be a locally accessible runtime web application. If, however, there were a locally accessible runtime web application, then that locally accessible runtime web application could be loaded.

The method 300 further includes a step 306 for prompting a user for credentials. Such credentials may include, for example, a username and password. The mechanism for prompting the user for credentials may be done with a bootstrap application that is loaded within the web application container. The bootstrap application has limited functionality and is designed to help the user get the runtime web application loaded within the web application container.

The method 300 further includes a step 308 for sending the credentials to a configuration server (e.g., 114, FIG. 1). The credentials may include, for example, a username, a password, and a unique identifier for the runtime web application. The configuration server may have access to a database that matches usernames or unique identifiers with a target URL for the customized runtime web application.

The method 300 further includes a step 310 for, after sending the credentials to the configuration server, receiving a target URL, the target URL pointing to a customized runtime web application on a first runtime web application server. The runtime web application may be customized by the user or an organization associated with the user. For example, the user may be an employee of a company. The company may have provided the web application service provider with customization details in order to create a customized version of the web application for its employees.

A customized runtime application may be one that includes a subset from the set of available features offered by the entity that produces or provides the runtime application. For example, a customer may select from a list of features the ones in which the customer is interested. Different customers will thus have different combinations of features for their own customized runtime web applications. For example, the web application service provider may offer voice, video, chat, screen sharing, and other types of media. Various customers may only wish to use a subset of those features and thus runtime web applications for such customers may include only the selected subset of features.

A customized runtime application may also include features that are created or designed specifically for a particular customer. For example, the customization may include the layout of the user interface, the branding, the text strings, the colors, the icons, the images, and other interface related features. In some examples, such features may be provided by the customer to the communication service provider. The communication service provider may then integrate such features into the customized runtime web application.

The method 300 further includes a step 312 for downloading the customized runtime web application to the computing system. The method 300 further includes a step 314 for executing the customized runtime web application. The runtime web application may thus interact with the runtime web application server, and other servers, to provide the desired functionality to the user. Specifically, in the example of a communication application, the user may establish communication sessions between his or her device and the devices of other users.

Figure 4:
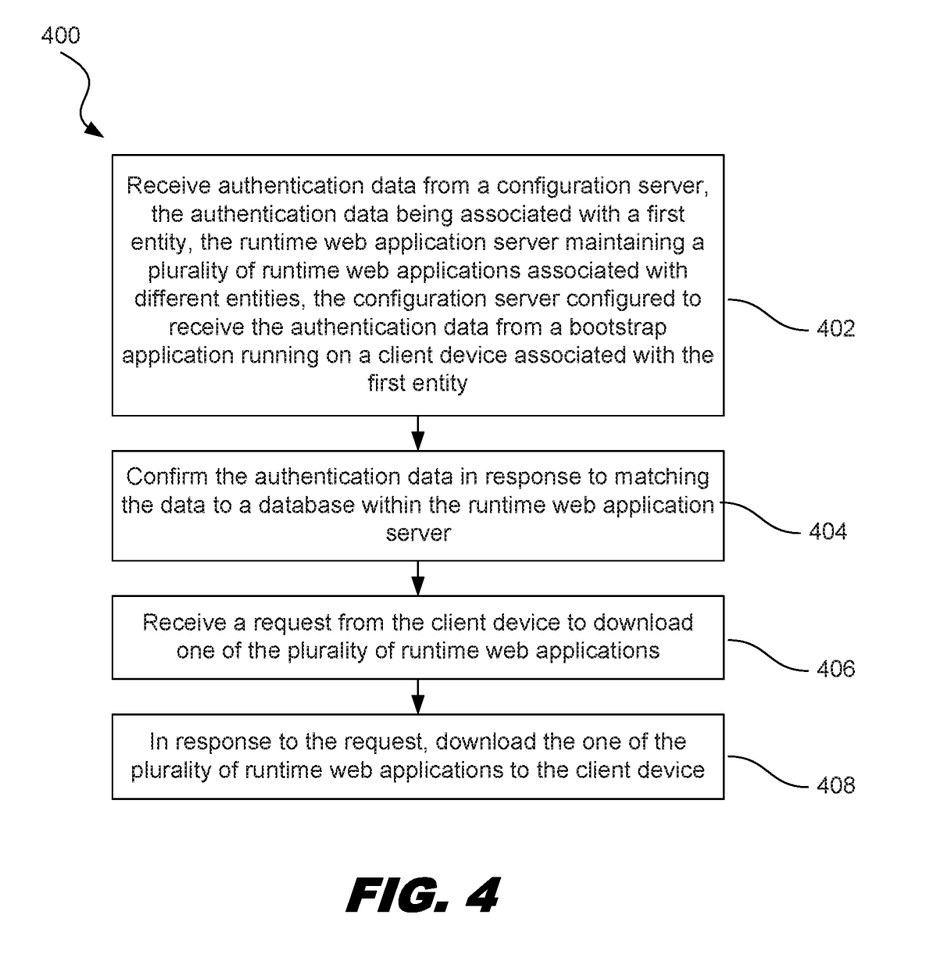
FIG. 4 is a flowchart showing an illustrative method performed by a server for web application configuration, according to one example of principles described herein.

FIG. 4 is a flowchart showing an illustrative method performed by a runtime web application server for web application configuration. In one example, the runtime web application server performs method 400 by reading code from a computer readable medium and executing that code with one or more processors. According to one example, the method 400 includes a step 402 for receiving authentication data from a configuration server. The authentication data may include, for example, credentials provided by a user that is requesting a customized version of a runtime web application. More specifically, the configuration server may be adapted to receive the authentication data from a bootstrap application within a web application container running on a client device associated with the user. The runtime web application server may maintain a plurality of runtime web applications associated with different entities.

The method 400 further includes a step 404 for confirming the authentication data in response to matching the data to a database associated with the runtime web application server. For example, the runtime web application server may maintain a database that matches runtime web applications with the credentials of the users who are authorized to use such runtime web applications. If there is no match, then the authentication request is denied. However, if the authentication data is confirmed, then the runtime web application server can respond with the target URL.

The method 400 further includes a step 406 for receiving a request from the client device to download one of the plurality of runtime web applications. For example, the client device may use the URL received to obtain the runtime web application. The method 400 further includes a step 402 for, in response to the request, downloading the one of the plurality of runtime web applications to the client device.

Figure 5:
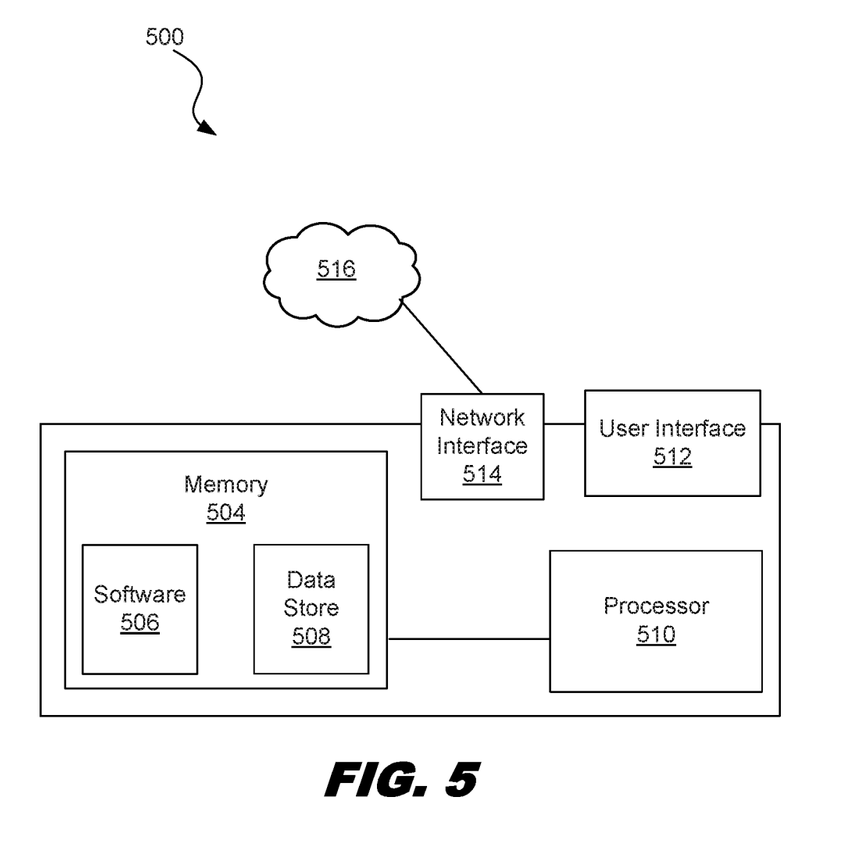
FIG. 5 is a diagram showing an illustrative computing system that may perform functions related to web application configuration, according to one example of principles described herein.

FIG. 5 is a diagram showing an illustrative computing system that may perform functions related to web application configuration. Such functions may include those described above in the text accompanying FIGS. 3-4. The computing system 500 may also be one of: a user device (e.g., 102a, FIG. 1), a configuration server (e.g., 114, FIG. 1), or a runtime web application server (e.g., 118, FIG. 1). According to certain illustrative examples, the computing system 500 includes a memory 504 which may include software 506 and a data store 508. The processing system 500 also includes a processor 510, a network interface 514, and a user interface 512.

The memory 504 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The computing system 500 also includes a processor 510 for executing the software 506 and using or updating the data 508 stored in memory 504. The software 506 may include an operating system and any other software applications a user may wish to install. In the case where the computing system 500 is associated with the web communication service infrastructure, the software 506 may be, for example, software designed to provide an interactive call menu creation service. In the case where the computing system 500 is a user device, the software 506 may be an application to render web content, such as a browser. The software 506 may include machine readable instructions of a computer program product that when executed, perform the functions described above in accordance with the text accompanying FIGS. 6-7.

The user interface 512 may include a number of input devices such as a mouse, touchpad, or touchscreen that allow the user to interact with the computing system 500. The user interface 512 may also include a number of different types of output devices such as a monitor or a touchscreen. The user interface allows the user to interact with the processing system 500 in a manner as described above.

The network interface 514 may include hardware and software that allows the processing system 500 to communicate with other processing systems over a network 516. The network interface 514 may be designed to communicate with the network 516 through hardwire media such as Ethernet, coaxial, fiber-optic, etc. The network interface 514 may also be designed to communicate with the network 516 using wireless technologies.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a computing system, the method comprising:
   executing a web application container;
   after the executing the web application container, determining that a runtime web application for the web application container is not stored locally on a client device;
   in response to the determining, prompting a user for credentials;
   sending the credentials to a configuration server;
   after sending the credentials to the configuration server, receiving a target uniform resource locator (URL), the target URL pointing to a runtime web application on a first runtime web application server;
   downloading the runtime web application from the first runtime web application server to the computing system; and
   executing the runtime web application.

2. The method of claim 1, further comprising, storing the runtime web application locally on the computing system.

3. The method of claim 1, further comprising, upon a subsequent startup of the web application container, executing the runtime web application in response to determining that runtime web application is locally accessible.

4. The method of claim 1, wherein the runtime web application is customized for an entity associated with the computing system.

5. The method of claim 4, wherein the runtime web application is customized for at least one of: an organization associated with the entity and an individual associated with the entity.

6. The method of claim 1, wherein the configuration server stores user credentials and URLs pointing to storage locations of runtime web applications.

7. The method of claim 1, further comprising, with a second computing device, downloading the runtime web application in response to providing credentials.

8. The method of claim 1, further comprising, with a third computing device associated with a different entity, downloading a second runtime web application.

9. The method of claim 8, wherein the second runtime web application is downloaded from a second runtime web application server.

10. The method of claim 1, wherein the runtime web application includes customizations for at least one of: colors, icons, text strings, and layout.

11. The method of claim 1, wherein the runtime web application comprises a communications application for a web communication service.

12. The method of claim 1, wherein the runtime web application has access to hardware of the computing system.

13. The method of claim 1, wherein the credentials include at least one of: a username, a password, and a unique identifier for the runtime web application.

14. The method of claim 1, further comprising, with the configuration server, authenticating with first runtime web application server before providing the target URL to the computing system.

15. A method performed by a runtime web application server, the method comprising:
   receiving authentication data from a configuration server, the authentication data being associated with a first entity, the runtime web application server maintaining a plurality of runtime web applications associated with different entities, the configuration server configured to receive the authentication data from a bootstrap application running in a web application container on a client device associated with the first entity, the bootstrap application running after a web application container is executed on the client device associated with the first entity, receipt of the authentication data being triggered by determining that there is no runtime web application stored locally on the client device associated with the first entity;
   confirming the authentication data in response to matching the authentication data to a database within the runtime web application server;
   receiving a request from the client device to download one of the plurality of runtime web applications; and
   in response to the request, downloading from the first runtime web application server, the one of the plurality of runtime web applications to the client device.

16. The method of claim 15, wherein the one of the plurality of runtime web applications is customized for the first entity.

17. The method of claim 15, wherein the first entity comprises at least one of: an organization and an individual.

18. A system comprising:
   a processor; and
   a memory comprising machine readable instructions that when executed by the processor cause the system to:
      in response to determining that no runtime web application for a web application container is stored locally on a client device, execute a bootstrap application within the web application container, the bootstrap application prompting a user for credentials;
      send credentials obtained from a user to a configuration server;
      after sending the credentials to the configuration server, receive a target uniform resource locator (URL), the target URL pointing to a runtime web application on a first runtime web application server; and
      download the runtime web application from the first runtime web application server.

19. The system of claim 18, wherein the system is further to store the runtime web application locally.

20. The system of claim 19, wherein the system is further to, upon startup of the web application container, load the runtime web application that is stored locally.

* * * * *